(12) United States Patent
Mikielski et al.

(10) Patent No.: US 6,803,415 B1
(45) Date of Patent: Oct. 12, 2004

(54) FLEXIBLE COMPOSITIONS BASED ON PROPYLENE POLYMERS

(75) Inventors: Raymond Mikielski, La Hulpe (BE); Jean-Louis Costa, Grimbergen (BE)

(73) Assignee: BP Belgium, Berchem (BE)

( * ) Notice: Subject to any disclaimer, the term of this patent is extended or adjusted under 35 U.S.C. 154(b) by 294 days.

(21) Appl. No.: 10/019,294

(22) PCT Filed: Jul. 3, 2000

(86) PCT No.: PCT/EP00/06233

§ 371 (c)(1),
(2), (4) Date: Mar. 20, 2002

(87) PCT Pub. No.: WO01/02482

PCT Pub. Date: Jan. 11, 2001

(30) Foreign Application Priority Data

Jul. 6, 1999 (BE) .............................................. 9900463

(51) Int. Cl.$^7$ ............................ C08F 8/00; C08L 23/00; C08L 23/04
(52) U.S. Cl. ....................................... 525/191; 525/240
(58) Field of Search .................................. 525/191, 240

(56) References Cited

U.S. PATENT DOCUMENTS

| 5,389,448 A | 2/1995 | Schirmer et al. |
| 5,856,406 A | 1/1999 | Betso et al. |
| 6,191,219 B1 * | 2/2001 | Tanaka et al. ................ 525/95 |

FOREIGN PATENT DOCUMENTS

| EP | 0373660 | 12/1989 |
| EP | 0416379 | 8/1990 |
| EP | 0 704 462 | 4/1996 |
| EP | 0 719 829 | 7/1996 |
| EP | 0 850 756 | 7/1998 |
| WO | 98/54260 | 12/1998 |

OTHER PUBLICATIONS

Harutun G. Karian, ed: "Chapter 7: Metallocene–plastomers as polypropylene impact modifiers" Handbook of Polypropylene and Polypropylen Composites pp. 201–234 1999.
C.Y. Cheng et al,: Plastomer and polypropylene blends for fiber and nonwoven applications ANTEC'95, pp. 2386–2392 1995.

* cited by examiner

Primary Examiner—Nathan M. Nutter
(74) Attorney, Agent, or Firm—Norval B. Galloway

(57) ABSTRACT

The flexible compositions having no elastomeric fractions comprise:

A) from 10 to 90 parts by weight of random copolymer of propylene and at least one comonomer selected from ethylene and $C_4$–$C_8$ alpha-olefins having a melting point of at least 100° C. and not exceeding 140° C. and a flow index measured at 230° C. under a weight of 2.16 kg (ASTM standard D1238, 1986) of from 0.5 to 15 g/10 min, and B) from 90 to 10 parts by weight of plastomer prepared with participation of a metallocene catalyst and consisting of a random copolymer of ethylene and at least one $C_3$–$C_{10}$ alpha-olefin having a density of from 0.860 to 0.920 g/cm$^3$, a melt flow index measured at 190° C. under a weight of 2.16 kg (ASTM standard D1238, 1986) of from 0.5 to 30 g/10 min, and a molecular mass distribution $M_w/M_n$ of at most 4.

These compositions provide an excellent compromise between flexibility and low-temperature impact resistance and heat resistance. They are suitable for producing flexible mouldings and very particularly for the manufacture by extrusion of films, of flexible sheeting, and of cables.

17 Claims, No Drawings

FLEXIBLE COMPOSITIONS BASED ON PROPYLENE POLYMERS

The present invention relates to flexible compositions based on propylene polymers. More particularly, it concerns flexible compositions based on random copolymers of propylene and on plastomers having no elastomeric fractions.

Flexible polymeric compositions and polymers have many outlets in sectors as varied as films, sheeting, the covering of soils, cables, etc. Plasticized vinyl chloride polymers are often used for these applications. However, these can cause problems connected to migration of the plasticizers used to provide their flexibility, or else connected to the emission of chlorinated products when they are incinerated.

An alternative previously proposed is recourse to what are known as flexible propylene polymers, such as block copolymers of propylene containing semi-crystalline and/or crystalline fractions and elastomeric fractions (cf. for example EP-A-373660 and EP-A-416379). Another previous proposal is to prepare flexible compositions by mixing block copolymers of propylene containing elastomeric fractions with plastomers consisting of copolymers of ethylene with alpha-olefins prepared with participation of metallocene catalysts (WO 98/54260).

It is an object of the present invention to provide novel flexible compositions based on propylene polymers having no elastomeric fractions. The invention therefore relates to flexible compositions based on propylene polymers having no elastomeric fractions comprising:

A) from 10 to 90 parts by weight of random copolymer of propylene and at least one comonomer selected from ethylene and $C_4$–$C_8$ alpha-olefins having a melting point of at least 100° C. and not exceeding 140° C. and a flow index measured at 230° C. under a weight of 2.16 kg (ASTM standard D1238, 1986) of from 0.5 to 15 g/10 min, and B) from 90 to 10 parts by weight of plastomer prepared with participation of a metallocene catalyst and consisting of a random copolymer of ethylene and at least one $C_3$–$C_{10}$ alpha-olefin having a density of from 0.860 to 0.920 g/cm$^3$, a melt flow index measured at 190° C. under a weight of 2.16 kg (ASTM standard D1238, 1986) of from 0.5 to 30 g/10 min, and a molecular mass distribution $M_w/M_n$ of at most 4.

The overall content of monomeric units derived from ethylene and/or from $C_4$–$C_8$ alpha-olefins in the random propylene polymer A) is generally between 3 and 20% by weight. The comonomer(s) entering with propylene into the composition of the random copolymer A) is/are generally selected from ethylene and $C_4$–$C_6$ alpha-olefins. Preference is given to ethylene, butene and hexene and in particular to ethylene and butene.

For the purposes of the present invention, the content of monomeric units derived from ethylene and/or from $C_4$–$C_8$ alpha-olefins in the random copolymer A) is determined by FOURIER-transform IR spectrometry. In particular, the content of monomeric units derived from ethylene is determined using the absorption bands at 732 cm$^{-1}$ and 720 cm$^{-1}$, and the content of butene is determined using the band at 767 cm$^{-1}$.

The random copolymers of propylene A) used in the compositions according to the invention advantageously have a melting point of at least 105° C., mostly not exceeding 135° C.

One first family of random copolymers of propylene A) which are well suited to preparation of the flexible compositions according to the invention consists of copolymers of propylene and ethylene containing from 3 to 10% by weight, preferably from 3 to 6% by weight, and more particularly from 3.5 to 5.5% by weight, of monomeric units derived from ethylene. This family of random propylene copolymers provides flexible compositions having excellent heat resistance (retention of flexibility at high temperature).

Among this first family of random copolymers preference is given to copolymers whose melting point (Tf) complies with the following relationship $$Tf \leq 157.6° C. - x 5° C. \qquad (1)$$

where x is the percentage by weight of ethylene, based on copolymer A)

A second family of random propylene copolymers A) which is well suited to preparation of the flexible compositions according to the invention consists of the copolymers of propylene and butene containing from 14 to 20% by weight of monomeric units derived from butene. This family of random propylene copolymers provides compositions with higher flexibility than the ethylene copolymers mentioned above, but their heat resistance is slightly lower.

Among this second family of random copolymers of propylene A) good results are given by the copolymers whose melting point (Tf) complies with the relationship (2) below:

$$Tf < 158° C. - y 1.78° C. \qquad (2)$$

in which y is the percentage by weight of butene, based on the copolymer A).

A third family of random copolymers of propylene A) which are well suited to preparation of the flexible compositions according to the invention consists of terpolymers of propylene, ethylene and butene containing from 0.5 to 2.5% by weight of monomeric units derived from ethylene and from 5 to 19.5%, preferably from 5 to 15%, by weight of monomeric units derived from butene.

In the case of this third family, use is most often made of polymers complying with the relationship (3)

$$Tf < 159.3° C. - x 7.87° C. - y 1.98° C. - 0.43 xy° C. \qquad (3)$$

in which x and y are respectively the % figures by weight for ethylene and butene.

The random propylene copolymers A) which are very particularly preferred for the purposes of the present invention are random copolymers of propylene and ethylene.

The random copolymers of propylene A) generally have a flexural modulus (EMod) measured at 23° C. in accordance with the ASTM standard D790M of from about 400 to 800 MPa. They advantageously have a flow index measured at 230° C. under a weight of 2.16 kg (ASTM standard D1238, 1986) not exceeding 10 g/10 min. Preference is also given to random copolymers of propylene A) which have uniform distribution of the monomeric units derived from the (isotactic) comonomer(s).

The random copolymers of propylene A) entering into the flexible compositions according to the invention may be prepared by any known process for the copolymerization of propylene with ethylene and/or alpha-olefins, for example by a process in the gas phase, or else in dispersion in the liquid phase in liquid monomer, and making use of any known Ziegler-Natta catalytic system of sufficient activity and productivity capable of polymerizing propylene stereospecifically and allowing the required amounts of ethylene and/or alpha-olefin to be incorporated into the polymer.

Preferred random copolymers (A) are advantageously obtained by copolymerization of propylene and ethylene and using catalytic systems comprising a solid based on titanium trichloride, an alkylaluminium compound, and optionally an electron donor. These catalytic systems have in particular been described in the patent applications EP-A-0261727 and EP-A-0334411, and in the patents U.S. Pat. Nos. 5,204,305 and 4,210,729 (SOLVAY POLYOLEFINS EUROPE-BELGIUM). For a given overall content of ethylene, the random copolymers of propylene and ethylene prepared with participation of these catalytic systems, when compared with copolymers prepared with participation of what are known as supported catalysts, have a more random character, reduced oligomer content, and better powder morphology.

Very particularly preferred random copolymers of propylene and ethylene comply with the equation:

$$[C_{2\times5}+] \leq 0.0094[C_{2\times3}]^2 - 0.0054[C_{2\times3}] + 0.0375$$

in which $[C_{2\times5}+]$ and $[C_{2\times3}]$, expressed in g/kg and evaluated by infrared absorption spectrometry are respectively:

$[C_{2\times5}+]$: the content of ethylenic units corresponding to the insertion of two, or more than two, ethylenic units between two propylenic units, measured at 720 cm$^{-1}$, and $[C_{2\times3}]$: the content of ethylenic units corresponding to the insertion of one ethylenic unit between two propylenic units, measured at the absorption maximum at about 732 cm$^{-1}$.

The overall content of monomeric units derived from the $C_3$–$C_{10}$ alpha-olefins in the plastomer B) is generally between 2.5 and 13 mol %.

The comonomer(s) entering with ethylene into the composition of the plastomer B) prepared with participation of a metallocene catalyst is/are generally selected from $C_3$–$C_8$ alpha-olefins. They are advantageously selected from alpha-olefins such as propylene, butene, hexene and octene, preferably from butene and octene. A very particularly preferred comonomer is octene. The plastomer B) generally has a single melting peak in the area of from 50 to 110° C., preferably between 60 and 105° C.

The plastomer B) preferably has a density amounting to 0.865 to 0.905 g/cm$^3$. Its melt flow index measured at 190° C. under a weight of 2.16 kg (ASTM standard D1238) is preferably below 20 g/10 min, still more particularly below 10 g/10 min.

The plasomers B) which have to be prepared with participation of a metallocene catalyst have properties distinct from those of ethylene copolymers having similar flow indices and densities but prepared with participation of multisite catalysts, such as Ziegler-Natta catalysts. In particular, they are characterized by a narrow molecular mass distribution and uniform distribution of the comonomers. The molecular mass distribution $M_w/M_n$ is most often below 3.5, but is at least 1.7. It is preferably between 3 and 1.8. The plastomers B) are also most often characterized by a comonomer distribution breadth index (CDBI), as defined in the patent application WO 97/38424, above 60. This index is preferably above 80 and still more particularly above 90.

For a given content of comonomers the plastomers prepared with participation of metallocenes, when compared with plastomers prepared with participation of multisite catalysts, such as Ziegler-Natta catalysts, have a more random character, reduced oligomer content, and better powder morphology (free-flowing powder).

The plastomers B) used in the flexible compositions according to the invention constitute known products which are commercially available. By way of examples of plastomers B) particularly well suited for producing the flexible compositions according to the invention, mention may be made of the plastomers marketed by EXXON with the trademark "EXACT". These are free-flowing granules.

The flexible compositions according to the invention advantageously comprise from 80 to 20 parts by weight of random propylene copolymer A) and from 20 to 80 parts by weight of plastomer B) and still more particularly from 70 to 30 parts by weight of random copolymer A) and from 30 to 70 parts by weight of plastomer B). It is self-evident that the compositions according to the invention may comprise one or more propylene copolymers A) and/or one or more plastomers B). The compositions according to the invention may also comprise a propylene polymer other than the copolymer A). Particular examples of this propylene polymer are homopolymers of propylene and random propylene copolymers containing up to 6% by weight of ethylene, other than the copolymer A). The propylene polymer preferably has a melting point above that of the copolymer A).

The propylene copolymer A) and the propylene polymer are most often used in ratios by weight of from 10:90 to 90:10, more particularly from 20:80 to 80:20. Compositions according to the invention comprising a terpolymer of propylene such as that described above under copolymer A), the plastomer B) and a random copolymer of propylene and ethylene containing from 2 to 5% by weight of ethylene are particularly preferred since they have a wider melting range while maintaining excellent flexibility and good heat resistance.

Other compositions according to the invention which have high suitability are those which comprise a random propylene copolymer containing from 3 to 6% by weight of monomeric units derived from ethylene and complying with the equation $$[C_{2\times5}+] \leq 0.0094[C_{2\times3}]^2 - 0.0054[C_{2\times3}] + 0.0375$$

[copolymer A)], plastomer B) and from 4 to 60 parts by weight of a random copolymer of propylene and ethylene containing from 2 to 5% by weight of ethylene, other than the copolymer A).

The properties of flexible compositions according to the invention, and particularly their flexibility and their heat resistance, are modifiable by varying the relative content of the polymeric constituents A) and B) and the nature of each of these. The flexible compositions according to the invention generally have a flexural modulus (EMod) measured at 23° C. according to the ASTM standard D790M of at most 550 MPa, mostly at most 500 MPa, but generally at least 50 MPa.

The flexible compositions according to the invention provide an excellent compromise between flexibility, low-temperature impact strain and heat resistance over a wide application range (retention of low moduli at high temperature). In particular, they combine flexibility and low-temperature impact resistance clearly improved over random copolymers of propylene A) and heat resistance (retention of low flexible moduli at temperatures above 80° C.) clearly improved over the plastomers B). They are also transparent and have reduced oligomer ($C_{12}$–$C_{54}$) content, generally not exceeding 1250 ppm and mostly 1000 ppm.

The manner in which the compositions according to the invention are obtained is not critical. They may therefore be manufactured by any of the traditional processes known for mixing polymers in the melt. The mixture of random propylene copolymer A) and plastomer B) in the melt is mostly produced under conditions of temperature and residence time such that at least partial melting of the random propylene copolymer A) is induced. They are preferably such that there is complete melting of the random propylene copolymer. The mixing is generally carried out at a temperature not exceeding 35° C.; this temperature mostly does not exceed 300DC; it preferably does not exceed 250° C. The minimum temperature at which the mixing in the melt is carried out is generally equal to or above 100° C., mostly equal to or above 130° C.; it is preferably equal to or above 140° C. Good results are obtained when this temperature is equal to or above 200° C. but does not exceed 240° C.

The residence time for the action selected for the mixing process varies with the nature of the polymeric constituents A) and B) and with the mixing temperature. The ideal residence time may advantageously be evaluated from preliminary experiments.

A mixing of the random copolymer A) and the plastomer B) may be carried out in any device known for this purpose. Use may therefore be made of internal or external mixers. Internal mixers are the most appropriate, and among these the most appropriate are continuous internal mixers, such as extruders. Extruders which can be suitable are particularly single-screw extruders, co-kneader extruders, co-rotating or counter-rotating twin-screw extruders, intermeshing or non-intermeshing, and multiscrew extruders. It is preferable to use an extruder of twin-screw type.

During the operation for mixing the random propylene copolymer A) and the plastomer B), it is, of course, possible to incorporate into the composition the optional propylene polymer, and also various additives, non-limiting examples being stabilizers, acid scavengers, antioxidants, organic or mineral colorants, fillers, such as talc or glass fibres, etc. The random propylene copolymer(s) A), the plastomer(s) B) and the optional propylene polymer are generally the only polymeric constituents of the compositions according to the invention.

The compositions according to the invention may be used as a constituent (for example as masterbatch) for the ultimate preparation of other compositions.

The flexible compositions according to the invention may be used in any of the traditional processes for processing thermoplastic materials, for example moulding, extrusion, or injection moulding, and in any apparatus habitually used for processing thermoplastic materials.

The flexible compositions based on propylene polymers according to the invention are suitable for producing a wide variety of flexible mouldings. They are particularly suitable for the manufacture of films, of flexible sheeting, or of cables (sheathing or insulation). They are also suitable for the manufacture of soil coverings, piping and profiles. The flexible compositions according to the invention are particularly suitable for the manufacture, by extrusion, of flexible sheeting or films, and also cables, and in particular of flexible sheeting or films, and also of cables having a flexural modulus (EMod) measured at 23° C. in accordance with the ASTM standard D790M of at most 450 MPa.

The examples below are intended to illustrate the invention.

EXAMPLES 1 to 3C

Examples 1 and 2 illustrate the compositions according to the invention comprising a random propylene copolymer obtained as described in Example 1 of the patent U.S. Pat. No. 5,204,305 (copolymer A) and a plastomer prepared with participation of a metallocene catalyst (plastomer B). Example 3C, given by way of comparison, relates to the copolymer A by itself.

In Example 1, a composition is prepared comprising 50 parts by weight of copolymer A and 50 parts by weight of plastomer B. In Example 2, a composition is prepared comprising 70 parts by weight of copolymer A and 30 parts by weight of plastomer B.

The random propylene copolymer A) used in Examples 1, 2 and 3 was a copolymer of propylene and ethylene containing 4.3% by weight of ethylene and having the following characteristics:

melting point: 133-132° C.

melt flow index (230° C., 2.16 kg—ASTM standard D1238, 1986): 4.50 g/qo min $[C_{2\times 3}]/[C_{2\times 5}+]$ ratio: 35/8

In Examples 1 and 2 use is made of the plastomer EXACT 8201, a copolymer of ethylene and octene having the following characteristics:

density: 0.882 g/cm$^3$ melt flow index (at 190° C., 2.16 kg—ASTM standard D1238, 1986): 1 g/10 min.

$M_w/M_n$ ratio: about 2.4

The compositions according to Examples 1 to 3 comprise, in addition to the polymeric constituent(s) detailed above, 2000 ppm of antioxidant and 1000 ppm of acid scavenger. The compositions were prepared by mixing ingredients and extrusion of the mixture in a Clextral BC45 twin-screw extruder, the temperature of the material being 209° C. The barrel of the extruder comprises 7 modules (six heating units and one conical heating die with 6 small holes of size 4 mm). The screw units have a diameter of 55. mm, and the total length of the screw is 30D. The temperature profile of the extrusion screw was as follows:

Zone 1 : 81° C.
Zone 2 : 170° C.
Zone 3 : 179° C.
Zone 4 : 199° C.
Zone 5 : 199° C.
Zone 6 : 199° C.
Zone 7 : 198° C.
Zone 8 : 200° C.

Starting from extruded pellets, various properties of the compositions according to Examples 1 and 2 and of the propylene copolymer according to Example 3C (comparative) were evaluated, and the results obtained are recorded in Table 1, which also shows the standards utilized for these evaluations. Thermal desorption is a measure of the content of oligomers, obtained by gas-phase chromatography under helium at 275° C. The oligomers ($C_{12}$–$C_{54}$) extracted at 275° C. were trapped at low temperature (−196° C.) and then reheated to 350° C. and passed into the gas-chromatography column.

TABLE I

| Property evaluated | Standard | Unit | Example No. 1 | Example No. 2 | Example No. 3C |
|---|---|---|---|---|---|
| Melt flow index (230° C., 2.16 kg) | ASTM D1238 | q/10 min | ~3.5 | ~3.5 | ~4.5 |
| Flexural modulus at 230° C. | ASTM D790M | MPa | 275 | 400 | 700 |
| Impact resistance at −40° C. (notched bar) | ISO 180/1A | ° C. | no fracture | no fracture | fracture |
| Brittleness temperature | ASTM D746 | ° C. | <−60 | −45 | 0 |
| Tensile strength | ASTM D638M | MPa | 19 | 24 | 21 |

TABLE I-continued

| Property evaluated | Standard | Unit | Example No. 1 | Example No. 2 | Example No. 3C |
|---|---|---|---|---|---|
| Elongation at break | ASTM D638M | % | >600 | >600 | >600 |
| Melting point | ASTM D3418 | °C. | 133 | 133 | 133 |
| Vicat softening point | ASTM D1525 | °C. | 78 | 94 | 120 |
| Heat distortion temperature (HDT) | ASTM D648 | °C. | 36 | 38 | ND* |
| Shore D hardness at 23° C. | ASTM D2240 | °C. | 47 | 51 | 62 |
| Thermal desorption ($C_{12}$–$C_{54}$ oligomers) | cf. above | mg/kg | 650 | 700 | 850 |

*ND: not determined

EXAMPLES 4 to 6

Examples 4 to 6 illustrate compositions according to the invention in which the copolymer A) present is a terpolymer of propylene containing 0.7% by weight of ethylene and 17.4% by weight of butene, and having the following characteristics:

melting point: 120° C.

melt flow index:

The plastomer B) is the same as that of Examples 1 and 2 and the compositions were obtained as described in the said examples. The properties of the compositions obtained in this way are given in Table II.

TABLE II

| Property evaluated | Unit | Example No. 1 | Example No. 2 | Example No. 3 |
|---|---|---|---|---|
| Content of copolymer A) | % | 70 | 50 | 40 |
| Content of plastomer B) | % | 30 | 50 | 60 |
| Melt flow index (230° C., 2.16 kg) | g/10 min | 3.2 | 2.8 | 2.5 |
| Flexural modulus at 23° C. | MPa | 265 | 156 | 92 |
| Impact resistance at −40° C. (notched bar) | — | no fracture | no fracture | no fracture |
| Brittleness temperature | °C. | −55 | <−60 | <−60 |
| Tensile strength | MPa | 11.1 | 7.9 | 6.5 |
| Elongation at break | % | >600 | >500 | >500 |
| Melting point | °C. | 80/110 | 76/114 | 74/109 |
| Vicat softening point | °C. | 79 | 69.4 | 64.3 |
| Heat distortion temperature (HDT) | °C. | 34.5 | 30.2 | not measurable |
| Shore D hardness at 23° C. | | 50 | 46.2 | 41.9 |
| Thermal desorption ($C_{12}$–$C_{54}$ oligomers) | ppm | 750 | 770 | 700 |

EXAMPLE 7

Example 7 illustrates a composition comprising 35 parts by weight of the terpolymer used in Examples 4 to 6, 30 parts by weight of EXACT 8201 plastomer and 35 parts by weight of a random propylene copolymer containing 3.2% by weight of ethylene and having a melt flow index of 2 g/10 min. The composition, prepared as in the preceding examples, has:

melt flow index (230° C., 2.16 kg): 4 g/10 min flexural modulus at 23° C.: 415 MPa brittleness temperature: −41° C.

tensile strength: 20 MPa elongation at break: >500% melting point: 77/138/145° C.

Vicat softening point: 78.8° C.

heat distortion temperature (HDT): 37.7° C.

Shore D hardness at 23° C.: 51.7 thermal desorption ($C_{12}$–$C_{54}$ oligomers): 730 ppm

What is claimed is:

1. A flexible composition based on one or more propylene polymers having no elastomeric fractions, said flexible composition comprising a blend of:

A) from 10 to 90 parts by weight of a random copolymer of propylene and at least one comonomer selected from the group consisting of ethylene and $C_4$–$C_8$ alpha-olefins, wherein said random copolymer of propylene has a melting point of at least 100° C. and not exceeding 140° C. and a melt flow index measured at 230° C. under a weight of 2.16 kg (ASTM standard D 1238, 1986) of from 0.5 to 15 g/10 min, and B) from 90 to 10 parts by weight of a plastomer prepared with participation of a metallocene catalyst, wherein said plastomer consists of a random copolymer of ethylene and at least one $C_3$–$C_{10}$ alpha-olefin, and wherein said plastomer has a density of from 0.860 to 0.920 g/cm³, a melt flow index measured at 190° C. under a weight of 2.16 kg (ASTM standard D 1238, 1986) of from 0.5 to 30 g/10 min, and a molecular mass distribution $M_w/M_n$ of at most 4, wherein said random copolymer of propylene A is selected from the group consisting of A1) copolymers of propylene and ethylene comprising from 3 to 6% by weight of monomeric units derived from ethylene;

A2) copolymers of propylene and butene comprising from 15 to 20% by weight of monomeric units derived from butane; and A3) terpolymers of propylene, ethylene and butene comprising from 0.5 to 2.5% by weight of monomeric units derived from ethylene and from 5 to 15% by weight of monomeric units derived from butene; and wherein said flexible composition has a flexural modulus (Emod) measured at 23° C. in accordance with ASTM standard D790M of 500 MPa or less.

2. The flexible composition based on one or more propylene polymers according to claim 1, wherein the random propylene copolymer is selected from the group consisting of copolymers of propylene and ethylene comprising from 3.5 to 5.5% by weight of monomeric units derived from ethylene.

3. The flexible composition based on one or more propylene polymers according to claim 1, wherein the random propylene copolymer has a flexural modulus (Emod) measured at 23° C. in accordance with the ASTM standard D790M of from about 400 to 800 MPa and a melt flow index measured at 230° C. under a weight of 2.16 kg (ASTM standard D1238, 1986) not exceeding 10 g/min.

4. The flexible composition based on one or more propylene polymers according to claim 1, wherein the plastomer consists of a random copolymer of ethylene and alpha-olefin containing from 2.5 to 13 mol % of an alpha-olefin selected from the group consisting of butene and octene.

5. The flexible composition based on one or more propylene polymers according to claim 1, wherein the plastomer consists of a random copolymer of ethylene and octene.

6. The flexible composition based on one or more propylene polymers according to claim 1, wherein the plastomer has a density of from 0.865 to 0.905 g/cm$^3$, a melt flow index measured at 190° C. under a weight of 2.16 kg (ASTM standard D1238, 1986) below 20 g/10 min and a molecular mass distribution $M_w/M_n$ below 3.5 but not less than 1.7.

7. The flexible composition based on one or more propylene polymers according to claim 1, wherein said composition comprises from 80 to 20 parts of the random propylene copolymer and form 20 to 80 parts of the plastomer prepared with participation of a metallocene catalyst.

8. The flexible composition based on one or more propylene polymers according to claim 1, wherein the one or more propylene polymers has a flexural modulus (Emod) measured at 23° C. in accordance with the ASTM standard D790M of at most 450 MPa.

9. The flexible composition based on one or more propylene polymers according to claim 1, comprising one or more random copolymers of propylene A) and one or more plastomers B.

10. The flexible composition based on one or more propylene polymers according to claim 1, further comprising a propylene polymer other than the copolymer A).

11. The flexible composition based on one or more propylene polymers according to claim 10, wherein the propylene polymer other than the copolymer A) has a melting point above 140° C.

12. A flexible sheeting or film comprising the composition according to claim 1.

13. A cable insulation or cable sheathing comprising the composition according to claim 1.

14. A flexible composition based on one or more propylene polymers of claim 1 wherein said flexible composition has an oligomer ($C_{12}$–$C_{54}$) content or less than about 1250 ppm.

15. The flexible composition of claim 14 having an oligomer content of less than about 1000 ppm.

16. A flexible sheeting or film comprising the composition according to claim 14.

17. A cable insulation or cable sheathing comprising the composition according to claim 14.

* * * * *